United States Patent [19]

Malaspina et al.

[11] 3,896,241

[45] July 22, 1975

[54] PREPARATION OF A WHEY PROTEIN CONCENTRATE

[75] Inventors: Alex Malaspina, Atlanta, Ga.;
Roberto H. Moretti, S. Paulo, Brazil

[73] Assignee: The Coca-Cola Company, Atlanta, Ga.

[22] Filed: May 24, 1974

[21] Appl. No.: 473,258

Related U.S. Application Data

[63] Continuation-in-part of Ser. No. 177,082, Sept. 1, 1971, abandoned.

[52] U.S. Cl. ............... 426/271; 260/122; 426/185; 426/356; 426/365; 426/491
[51] Int. Cl. ............................................ A23c 21/00
[58] Field of Search ........... 426/330, 356, 423, 478, 426/491, 185, 271, 41, 365; 260/121, 122; 204/180

[56] References Cited
UNITED STATES PATENTS

| | | | |
|---|---|---|---|
| 2,155,843 | 4/1939 | Schmidt | 426/423 |
| 2,465,906 | 3/1949 | Meade et al. | 426/271 |
| 2,606,181 | 8/1952 | Pratt et al. | 260/122 |
| 3,325,389 | 6/1967 | Parsi et al. | 204/180 |

OTHER PUBLICATIONS

Horton et al., Membrane Separation Processes For the Abatement Of Pollution From Cottage Cheese Whey, Presented at the Cottage Cheese and Cultured Milk Products Symposium, University of Maryland, College Park, Maryland, 3/1970, (pp. 1–17).

*Primary Examiner*—David M. Naff
*Attorney, Agent, or Firm*—Robert A. Lester; John R. Martin; W. Dexter Brooks

[57] ABSTRACT

Whey from bovine milk is treated by a process involving passing whey through a diatomaceous earth filter, subjecting the filtered whey to ultrafiltration with water injection to form a whey protein concentrate and contacting the concentrate with a strongly acidic cationic exchange resin to produce a whey protein concentrate low in viable and total microbial count, low in mineral salt and having a pH in the range of 2.7 to 3.6.

10 Claims, No Drawings

PREPARATION OF A WHEY PROTEIN CONCENTRATE

CROSS REFERENCE TO RELATED APPLICATION

This is a continuation-in-part of our copending U.S. patent application Ser. No. 177,082, filed Sept. 1, 1971, now abandoned.

FIELD OF THE INVENTION

This invention relates to the treatment of whey protein to make it suitable for inclusion in acid beverage formulations.

BACKGROUND OF THE INVENTION

Bovine milk contains about 3% casein, 0.65% whey protein, 4.5–5.0% lactose, 3–4% milkfat, 0.3–0.7% mineral salts, plus a variety of water and fat-soluble vitamins, lactic and citric acids, urea, free amino-acids and polypeptides. In the manufacture of cottage cheese or casein, the milkfat is first separated centrifugally (as cream) and the casein fraction of the milk is then precipitated at its isoelectric point by the addition of acid (typically lactic, hydrochloric or sulfuric). The precipitated casein (about one-tenth of the original weight of milk) is then treated to yield the desired casein product or cottage cheese. The remainder of the original milk, containing all the other components listed above, is called whey. For high-fat content cheeses, the process varies somewhat. The whole milk (either unacidified or partially acidified) is treated with an enzyme (such as rennet, porcine pepsin or a vegetable enzyme) to coagulate and precipitate casein. The precipitated casein, called "curd", is cut and treated in a suitable manner to yield the desired cheese, with the remainder of the original milk, called whey, being drained off the curd.

Whey, because of its high organic content (about 5.5–6.5% by weight) has long been recognized as a serious pollutant. Its protein content, however, (about 0.6–0.8% by weight) has the unusual property of being acid soluble. Whey protein has in addition an exceedingly well-balanced ratio of the essential amino-acids, making it a satisfactory source of protein for food fortification. With regard to the acknowledged protein deficiency in many areas of the world, it seems desirable to utilize, rather than waste, this protein source. One suitable way of utilizing this protein would be as a component in a beverage formulation.

In order to produce a whey protein product satisfactory for beverage formulation the level of the micro-organisms present must be drastically reduced or spoilage will occur. Furthermore, whey contains 0.3–0.7% by weight of mineral salts which, if not removed, impart undesirable organoleptic properties to the protein product. The salts also exert a high acid buffering capacity, thereby requiring the addition of larger amounts of acid to beverage formulation, which can be expensive.

Thus, there is a need to produce a whey protein product, having a very low micro-organism count and a low mineral salt concentration, which will be suitable for use in formulating beverages.

SUMMARY OF THE INVENTION

To fulfill this need, one embodiment of the present invention offers a process for treating whey protein from a bovine milk whey protein source to provide a product suitable for incorporation into beverages, which process comprises passing whey through a diatomaceous earth filter, subjecting the whey to ultrafiltration with water injection, preferably at pressures in the range of 100–300 psi. and thereafter contacting the concentrate with a strongly acidic cationic exchange resin to produce a whey protein concentrate low in viable and total microbial count, low in mineral salt and having a pH in the range of 2.7–3.6. Preferably the whey is heated after passage through the diatomaceous earth filter and prior to ultrafiltration to a temperature of about 37°C. The whey protein concentrate is most suitably cooled to about 5°C prior to contacting the concentrate with the ion exchange resin. After contacting the concentrate with the ion exchange resin the concentrate is preferably dried.

Another embodiment is concerned with a process for treating the whey protein which comprises removing at least a portion of casein and milk fat from the whey, pasteurizing the whey at a temperature below the thermal denaturation point of the whey, cooling the whey, passing the cooled whey through a diatomaceous earth filter, subjecting the filtered whey to ultrafiltration with water injection, preferably at pressures in the range of 100–300 psi, and thereafter contacting the concentrate with a strongly acidic cationic exchange resin to produce a whey protein concentrate low in viable and total microbial count, low in mineral salt and having a pH in the range of 2.7–3.6. The whey preferably is heated after passage through the diatomaceous earth filter and prior to ultrafiltration to a temperature of about 37°C. Most advantageously, the whey protein concentrate is cooled to about 5°C. prior to contacting the concentrate with the ion exchange resin. After contacting the concentrate with the ion exchange resin, the concentrate is preferably dried.

DETAILED DESCRIPTION

The broadest aspects of the present invention provide for a process for treating whey protein from a bovine milk whey protein source to provide a product suitable for incorporation in beverages by passing whey through a diatomaceous earth filter, subjecting the whey to ultrafiltration with water injection and thereafter contacting the concentrate with a strongly acidic cationic exchange resin to produce a whey protein concentrate low in viable and total microbial count, low in mineral salt level and having a pH in the range of 2.7–3.6.

In a specific preferred embodiment of the present invention, raw whey is drained by gravity from cheese vats into receiving tanks. From these tanks it is centrifugally clarified to remove residual casein (for example using a Westphalia model KG4006), and then centrifugally separated at about 40°C (for example using an Alfa-Laval model 2181R cream separator) to remove residual milkfat. The flow rate through the clarifier and separator is 1,800–2,100 liters/hour, maintained by a centrifugal pump. Additional casein will normally also be removed in the separator. The defatted and clarified whey then is passed through a plate-and-frame pasteurizer where it is heated to 67°–68°C for 60–66 seconds. Higher temperatures than this may cause thermal denaturation of the whey protein and render it insoluble. Lower temperatures would result in a lower reduction in the viable organism count. The total microbial count on the raw whey, as received from the cheese vat, is of the order of $10^8$ organisms per milliliter, with a viable count of $10^7$/ml. After the pasteurizer the viable count is reduced to $10^4$–$10^5$ per ml.

The pasteurized whey is cooled to 5°C and stored briefly in 2,200 liter tanks at this temperature. 100g of "Speed-Plus" filter aid are added to each 100 liters of whey. The whey then is passed through a diatomaceous earth filter for example at a flow rate of 1,500 liters/hour. The filter used is a Laredo autoclave filter precoated with 500 g/m$^2$ of diatomaceous earth (such as Fibra-Flow). The filter serves to remove more of the remaining casein and milkfat and to reduce both the total and viable microbial population of the whey. Typically the total count after filtration is reduced to $10^7$/ml and the viable count $10^3$–$10^4$ per ml. The difference between the total and viable count represents the number of dead cells. It is important to remove as many of the dead cells and to reduce the number of live cells as possible as they have been found to cause instability in protein enriched soft drink formulations.

The whey, thus pretreated, is passed through a plate-and-frame heat exchanger to heat it to 37.5°C, the exact temperature being dependent on the upper limit of the membrane stability in the ultrafiltration device which follows. From this heat exchanger, the heated whey is passed to a suitable ultrafiltration system. The particular system used to obtain the results described in this invention was manufactured by Calgon-Havens Systems of San Diego, California. The design was based on an extension of the art for the processing of pulp liquor by reverse osmosis, as described by Ammerlaan & Wiley in "The Engineering Evaluation of Reverse Osmosis as a method of Processing Spent Liquors of the Pulp and Paper Industry". The preferred system contains 81 Calgon-Havens series 215 modules but could include more. For example, a system including 96 such modules has been found to work effectively. The membranes of the modules have a 95% molecular weight cut-off of 17,000. This means that all the protein in the whey stays on the upstream side of the membrane, while much of the lactose and the ash, which have molecular weights considerably less than 17,000, passes through the membrane, thus enriching the feed stream in the whey protein component. The engineering design of this system, as an extension to the art described by Ammerlaan, consisted of seven parallel rows of Havens 215 modules, each with six modules in series, feeding into three more parallel rows, each containing six modules in series. These two banks of modules comprise the first stage of the system, and are fed by a Moyno 9P3 progressing cavity pump which supplies the treated whey at a flow rate of between 2.25 and 4.40 liters per minute per row of modules. The inlet feed pressure does not exceed 300 PSIG and would typically be in the range 220–300 PSIG. With the cellulose acetate membranes used in the Calgon-Havens modules, the inlet temperature should not exceed 37.5°C. or accelerated membrane deterioration will occur. The product leaving the second half of this first stage will have a protein content of about 1½% (w/v), and is passed into a holding tank. From this holding tank, the product passes into a smaller progressing cavity pump, for example a Moyno 9P2, in which it is admixed with a certain volume of water, to achieve what has come to be known as "water injection." This pump also serves to raise the pressure of the feed back up to the desired operating pressure of 300 PSIG maximum, as, because of the hydrodynamic configuration of the Calgon-Havens System, the pressure drop through the system, especially at high flow rates, is very high, e.g. after the first stage the operating pressure is about 50 PSIG. The second stage of this particular ultrafiltration system would typically contain two parallel rows each of seven Calgon-Havens 215 modules in series, feeding into a final row of seven modules. The product coming out of the last row of seven modules is the whey protein concentrate. The rate of water injection into the second stage pump can be varied depending on the amount of lactose and salts to be removed from the original whey; values between 10 and 30% of the feed flow rate to the first stage would by typical. Using a feed flow rate to the first stage of 21 liters per minute (3 liters per minute to each row of modules), and a water injection rate of 4 liters per minute (20% of the initial feed flow rate), one can remove approximately 92% of the water, lactose and mineral salts from the original whey feed stream, while retaining most of the protein in the whey protein concentrate. A similar proportion of other micromolecular components, and the vitamins, will also be lost through the membrane. By variation of the water injection rate and the system operating conditions, one can obtain a liquid whey protein concentrate with a protein to lactose ratio varying from 1:2 to 2:1, and a protein to salt ratio varying from 10:1 to 20:1. The ultrafiltration system described in detail above would now be available as an item of commerce from Calgon-Havens Systems, formerly known as Havens International, and which has more recently become the Fluid Sciences Division of Universal Oil Products Company (effective 1973). The system described above is a continuous single-pass ultrafiltration system, that is to say, the feed passes through in the single pass and comes out as the product, with no recycle.

An obvious extension of this art is to the design of a recirculation-type batch ultrafiltration system in which a smaller membrane area is used in conjunction with a large holding tank. The holding tank could be filled and the material continuously circulated across the membrane until a sufficient quantity of the water and micromolecular components had permeated through the membrane. Water injection in this case could simply be acheived by adding water to the holding tank at an appropriate point during the fractionation step. The final product would then be what remained in the holding tank after the appropriate volume of the original water and microsolutes had been removed, thus enriching the remaining material in whey protein. Such a batch system is alluded to in, for example, commercial literature of Abcor, a membrane system manufacturing company of Cambridge, Massachusetts.

The whey protein concentrate obtained from the ultrafiltration step is cooled to 5°C. and subjected to ion exchange in a 100-liter bed of a strongly acidic cation exchange resin in which the whey has a residence time of 30 to 60 minutes. Suitable cationic exchange resins include Lewatit S-100 by Bayer. The cation exchange serves both to reduce further the mineral salt level in the product and to reduce the pH. Typically, before cation exchange the salt concentration in the whey protein concentrate is 0.6–0.9% by weight, and the pH is 6.4–6.7. After cation-exchange the salt concentration is reduced to 0.2–0.5% by weight, and the pH to 3.2–3.8. These values are obtained with a water injection rate of 30–40% of the flow rate of concentrated whey to the second stage of the ultrafiltration unit. This reduction in pH of the concentrate serves to further decrease the microbial population. The microbial count on the ion-exchanged product is typically, (total)$10^8$/ml and (viable) $10^1$–$10^2$/ml.

After ion exchange treatment is completed, the whey is stored at about 5°C. Sufficient mineral acid such as phosphoric acid and/or citric acid may be added to reduce the pH to 2.7 to further prevent microbial spoilage during storage.

The whey protein concentrate is then dried (by means such as spray drying) to yield an acid-pH soluble powder suitable for reconstitution into beverage formulations. The total microbial count on the powder is $10^9$ per gram, and the viable count is 0–$10^1$ per gram. The protein composition is in the range 45–55% protein, depending on the exact operating conditions of the ultrafiltration unit, and the composition of the initial whey.

While various parts of the process of the invention have been described as batch type unit operations and other parts as continuous unit operations, it can be appreciated that, by a proper provision of equipment and suitable metering, any part of the process may be suitably operated on either basis. It will also be apparent to those skilled in the art that, although this invention has been described in terms of a specific example, various other modifications occur to one of ordinary skill in the art within the purview of the appended claims.

We claim:

1. A process for producing a whey protein concentrate suitable for incorporation into beverages which comprises providing whey from bovine milk, passing the whey through a diatomaceous earth filter, subjecting the whey to ultrafiltration with water injection to form a whey protein concentrate and thereafter contacting the concentrate with a strongly acidic cationic exchange resin to produce a whey protein concentrate low in viable and total microbial count, low in mineral salt and having a pH in the range of 2.7–3.6.

2. A process according to claim 1 which comprises heating the whey after passage through the diatomaceous earth filter and prior to ultrafiltration to a temperature of about 37°C.

3. A process according to claim 1 which comprises carrying out the ultrafiltration at pressures in the range of 100–300 psi.

4. A process according to claim 1 which comprises cooling the whey protein concentrate to about 5°C. prior to contacting the concentrate with the ion exchange resin.

5. A process according to claim 1 which comprises drying the whey protein concentrate after contacting the concentrate with the ion exchange resin.

6. A process for producing a whey protein concentrate suitable for incorporation into beverages which comprises removing at least a portion of casein and milk fat from whey from bovine milk, pasteurizing the whey at a temperature below the thermal denaturation point of the whey, cooling the whey, passing the cooled whey through a diatomaceous earth filter, subjecting the filtered whey to ultrafiltration with water injection to form a whey protein concentrate and thereafter contacting the concentrate with a strongly acidic cationic exchange resin to produce a whey protein concentrate low in viable and total microbial count, low in mineral salt and having a pH in the range of 2.7–3.6.

7. A process according to claim 6 which comprises heating the whey after passage through the diatomaceous earth filter and prior to ultrafiltration to a temperature of about 37°C.

8. A process according to claim 6 which comprises carrying out the ultrafiltration at pressures in the range of 100–300 psi.

9. A process according to claim 6 which comprises cooling the whey protein concentrate to about 5°C. prior to contacting the concentrate with the ion exchange resin.

10. A process according to claim 6 which comprises drying the whey protein concentrate after contacting the concentrate with the ion exchange resin.

* * * * *